United States Patent
McKinley et al.

(10) Patent No.: US 7,328,572 B2
(45) Date of Patent: Feb. 12, 2008

(54) EXHAUST AFTERTREATMENT DEVICE WITH STAR-PLUGGED TURBULATOR

(75) Inventors: Thomas L. McKinley, Columbus, IN (US); Randolph G. Zoran, McFarland, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 11/360,941

(22) Filed: Feb. 23, 2006

(65) Prior Publication Data

US 2007/0193252 A1    Aug. 23, 2007

(51) Int. Cl.
*F01N 3/00* (2006.01)
(52) U.S. Cl. .......................... 60/286; 60/295; 60/303; 60/309; 60/324; 239/399; 222/145.6; 222/145.7
(58) Field of Classification Search .................. 60/286, 60/295, 299, 300, 303, 309, 324; 239/398, 239/399; 222/137, 145.5, 145.6, 145.7
See application file for complete search history.

(56) References Cited

U.S. PATENT DOCUMENTS

| | | | |
|---|---|---|---|
| 4,872,528 A | 10/1989 | Goplen et al. | |
| 6,203,770 B1 * | 3/2001 | Peter-Hoblyn et al. | 423/212 |
| 6,449,947 B1 | 9/2002 | Liu et al. | |
| 6,540,046 B1 | 4/2003 | Schuhmacher et al. | |
| 6,601,385 B2 | 8/2003 | Verdegan et al. | |
| 6,712,869 B2 | 3/2004 | Cheng et al. | |
| 6,722,123 B2 | 4/2004 | Liu et al. | |
| 6,722,124 B2 * | 4/2004 | Pawson et al. | 60/286 |
| 6,745,562 B2 * | 6/2004 | Berriman et al. | 60/324 |
| 7,065,958 B2 * | 6/2006 | Funk et al. | 60/286 |
| 7,152,396 B2 * | 12/2006 | Cheng | 60/286 |

* cited by examiner

*Primary Examiner*—Binh Q. Tran
(74) *Attorney, Agent, or Firm*—Andrus, Sceales, Starke & Sawall, LLP; J. Bruce Schelkopf

(57) ABSTRACT

An exhaust aftertreatment device has a turbulator provided by a tube having a perforated star-plugged downstream end.

6 Claims, 1 Drawing Sheet

EXHAUST AFTERTREATMENT DEVICE WITH STAR-PLUGGED TURBULATOR

BACKGROUND AND SUMMARY

The invention relates to aftertreatment devices for internal combustion engine exhaust, and more particularly to chemical species injection mixing.

To address engine emission concerns, new standards continue to be proposed for substantial reduction of various emissions, including NOx and particulate emissions. Increasingly stringent standards will require installation of aftertreatment devices in engine exhaust systems. Some of the aftertreatment technologies require certain chemical species to be injected into the exhaust system. For example, HC or fuel is injected in some active lean NOx systems, and additives such as cerium and iron are injected for diesel particulate filter regeneration, and urea solution is injected in selective catalytic reduction (SCR) systems for NOx reduction. These injected chemical species need to be well mixed with exhaust gas before reaching catalysts or filters for the systems to perform properly.

The present invention arose during continuing development efforts directed toward the above exhaust aftertreatment devices.

DETAILED DESCRIPTION

Figure 1:
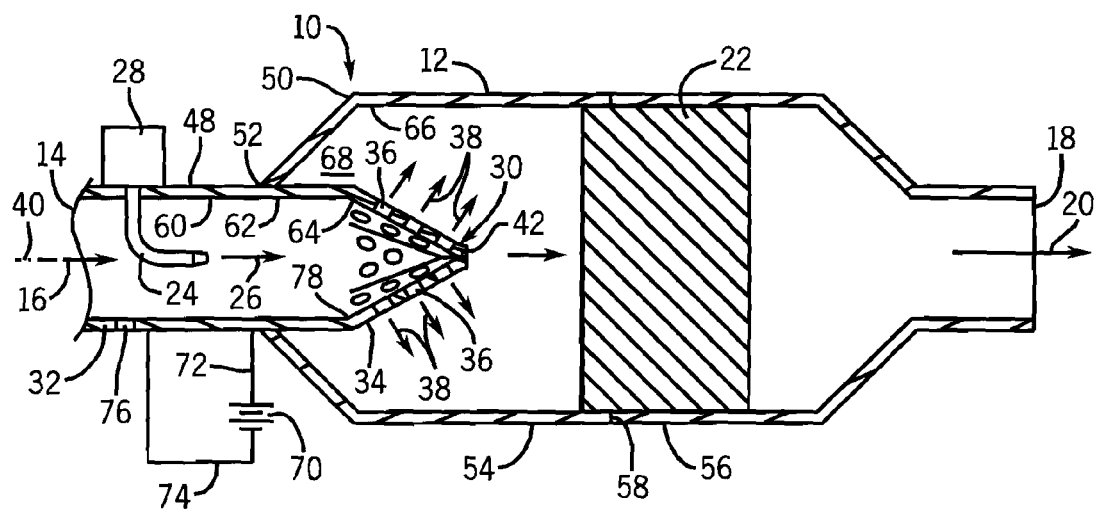
FIG. 1 is a side schematic sectional view of an exhaust aftertreatment device in accordance with the invention.
Figure 2:
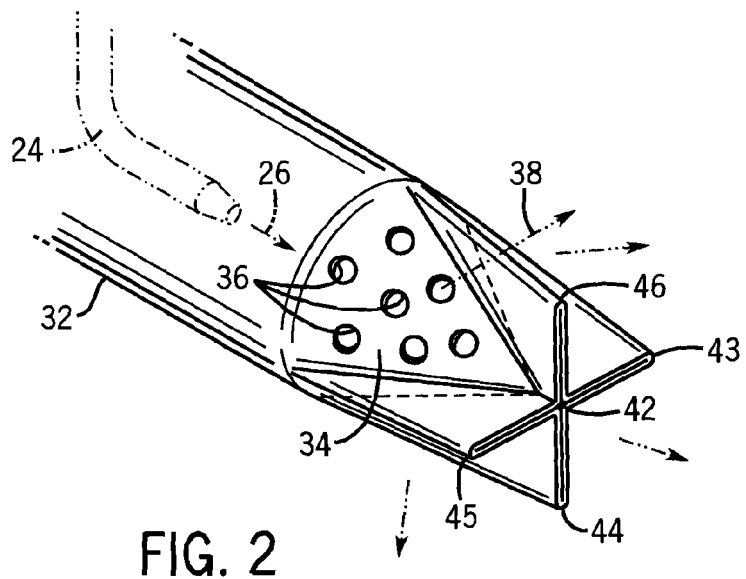
FIG. 2 is a perspective view of a portion of FIG. 1.

FIG. 1 shows an exhaust aftertreatment device 10 including a housing 12 having an upstream inlet 14 for receiving engine exhaust as shown at arrow 16, and a downstream outlet 18 for discharging the exhaust as shown at arrow 20. An aftertreatment element 22, for example a selective catalytic reduction (SCR) catalyst and/or an oxidation catalyst (e.g. a diesel oxidation catalyst, DOC) and/or a particulate filter (PF), is provided in the housing for treating the exhaust. An injector 24 is provided in the housing for injecting chemical species as shown at arrow 26 mixing with the exhaust prior to reaching aftertreatment element 22. For example, in one embodiment, aqueous urea solution is injected from reservoir or tank 28. A turbulator 30 is provided in the housing between injector 24 and aftertreatment element 22. The turbulator is provided by a tube 32 having a perforated star-plugged downstream end 34. The exhaust and chemical species pass through perforations 36 of the tube as shown at arrows 38. Star-plugged exhaust muffler tubes are known, for example U.S. Pat. Nos. 4,872,528 and 6,540,046, incorporated herein by reference, and hence readily available tooling may be used to form star-plugged end 34. Housing 12 and tube 32 extend coaxially along an axis 40. Perforated star-plugged downstream end 34 of tube 32 has a conical profile pointing downstream to an end 42 having a plurality of star tips, such as 43, 44, 45, 46, FIG. 2, extending radially therefrom. Star-plugging typically provides four star tips, and such is preferred in the present embodiment.

The housing has an upstream housing section 48 and an aftertreatment housing section 50 meeting at a junction 52. The aftertreatment housing section may include subsections 54 and 56 meeting at a separable joint 58 between the upstream and downstream axial ends of aftertreatment element 22 to enable servicing, cleaning or replacement of the latter. Injector 24 is in upstream housing section 48. Aftertreatment element 22 is in aftertreatment housing section 50. Tube 32 has an upstream segment 60, an intermediate segment 62, and a downstream segment 64. Upstream segment 60 provides the noted upstream housing section 48. Intermediate segment 62 extends axially through and into aftertreatment housing section 50 at junction 52. Aftertreatment housing section 50 has a sidewall 66 spaced radially outwardly of intermediate segment 62 and downstream segment 64 by an annular gap 68 therebetween. Downstream segment 64 provides the noted perforated star-plugged downstream end. Downstream segment 64 is axially spaced from the junction 52 of the noted upstream and aftertreatment housing sections by intermediate segment 62 of the tube therebetween. Injector 24 is in the noted upstream segment 60 and is upstream of junction 52. Upstream and intermediate segments 60 and 62 are of the same diameter, which diameter is less than the diameter of sidewall 66 of the aftertreatment housing section.

As is known, the injected chemical species is subject to coagulation and coalescence. In a further embodiment, a heater is provided for heating tube 32, including perforated star-plugged downstream end 34, to minimize the noted coagulation and coalescence, and to enhance vaporization of the injected chemical species. In one embodiment, such heat source is provided by a voltage source 70 connected to the tube by a pair of electrical conductors 72, 74, comparably as shown in U.S. Pat. No. 6,722,123, incorporated herein by reference.

The injector is shown at a J-shaped tubular member 24 injecting fluid axially as shown at arrow 26. Other types of injectors may be used. In one alternative, a J-shaped tubular member is used with outlet ports or sprays oriented and directing flow radially rather than axially. In another alternative, injection of the spray is provided through the wall of tube 32, for example apertures through the tube wall as shown in dashed line at 76, with a wide range of possible spray angles, and with no internal tube such as 24. In another embodiment, multiple spray tubes 24 or the like may be used. Other injectors and spray designs are possible.

In another alternative, turbulator 30, including star-plugged downstream end 34, is coated for purposes of corrosion protection and/or catalysis. When stainless steel is used for turbulator 30, it has been found that urea deposits can cause corrosion of such stainless steel material. A catalytic coating 78 can be used to promote hydrolysis, for the urea to decompose and hydrolyze into ammonia and carbon dioxide, and for the ammonia to become uniformly distributed across the flow front before entering the catalyst. A catalytic coating on the turbulator may thus be desirable to provide a uniform distribution of ammonia or other concentration of chemical species entering the catalyst. Such coatings can thus be used for improving both reliability and performance.

It is expected that various equivalents, alternatives and modifications are possible within the scope of the appended claims.

What is claimed is:

1. An exhaust aftertreatment device comprising:
   a housing having an upstream inlet for receiving exhaust, and a downstream outlet for discharging said exhaust;
   an aftertreatment element in said housing for treating said exhaust;

an injector in said housing upstream of said aftertreatment element and injecting chemical species mixing with said exhaust prior to reaching said aftertreatment element;

a turbulator in said housing between said injector and said aftertreatment element, said turbulator comprising a tube having a perforated star-plugged downstream end, wherein:

said housing and said tube extend coaxially along an axis;

said housing comprises an upstream housing section and an aftertreatment element housing section meeting at a junction;

said injector has an injection tip in said upstream housing section, said injection tip being upstream of said junction;

said aftertreatment element is in said aftertreatment housing section;

said tube has an upstream segment, an intermediate segment, and a downstream segment;

said upstream segment of said tube provides said upstream housing section;

said intermediate segment of said tube extends axially through and into said aftertreatment housing section at said junction of said upstream and aftertreatment housing sections;

said aftertreatment housing section has a sidewall spaced radially outwardly of said intermediate segment and said downstream segment of said tube by an annular gap therebetween;

said downstream segment of said tube provides said perforated star-plugged downstream end;

said downstream segment of said tube is axially spaced from said junction of said upstream and aftertreatment housing sections by said intermediate segment of said tube therebetween.

2. The exhaust aftertreatment device according to claim 1 wherein said upstream and intermediate segments of said tube are of the same diameter, which diameter is less than the diameter of said sidewall of said aftertreatment housing section.

3. The exhaust aftertreatment device according to claim 1 wherein said injector comprises a tubular member within said tube.

4. The exhaust aftertreatment device according to claim 3 wherein said tubular member has a J-shape.

5. The exhaust aftertreatment device according to claim 1 wherein said injector comprises one or more apertures through said housing.

6. The exhaust aftertreatment device according to claim 1 comprising a catalytic coating on said turbulator including said perforated star-plugged downstream end.

* * * * *